United States Patent Office 2,984,642
Patented May 16, 1961

2,984,642

VULCANIZATION OF HALOGENATED RUBBERY POLYMERS WITH HEXAHYDRODIAZINES

Leon S. Minckler, Jr., Metuchen, Delmer L. Cottle, Highland Park, and Theodore Lemiszka, Roselle, N.J., assignors to Esso Research and Engineering Company, a corporation of Delaware No Drawing. Filed Apr. 22, 1959, Ser. No. 808,001

16 Claims. (Cl. 260—41.5)

This invention relates to rubbery polymeric compositions which are halogenated copolymers of isoolefins and multiolefins and to the preparation and vulcanization of such compositions and more particularly to improved methods for curing halogenated butyl rubber at an accelerated rate with minor proportions of heterocyclic secondary diamines containing four carbon atoms and being of the class of hexahydrodiazines.

Copolymers of the above general type, especially where the copolymer contains about 85 to 99.5% (preferably about 95 to 99.5%) of a $C_4$ to $C_7$ isoolefin such as isobutylene with about 15 to 0.5% (preferably 5 to 0.5 weight percent) of a multiolefin of about 4 to 14, preferably about 4 to 6 carbon atoms and having a Staudinger molecular weight of between about 20,000 and 300,000, are commonly referred to in patents and literature as "butyl rubber" or GR–I rubber (Government rubber-isobutylene) and, for example, is referred to as "butyl rubber" in the textbook "Synthetic Rubber," by G. S. Whitby. The preparation of butyl type rubber is described in U.S. Patent 2,346,128 to Thomas et al. as well as in technical literature. In general, the multiolefinic component of the rubber comprises a conjugated diolefin such as isoprene, butadiene, dimethyl butadiene, piperylene, etc. The reaction product of isobutylene and isoprene is preferred. Butyl rubber has a mole precent unsaturation of between about 0.5 and 15.0.

It is known that halogenated butyl-type rubbery copolymers may be vulcanized with zinc oxide or acylic diamines or triamines. Such halogenated copolymers are produced by halogenating the butyl rubber in a manner which does not degrade the molecular weight thereof, but halogenated sufficiently to produce a rubbery product which, when vulcanized, retains its tensile strength upon heat aging. However, the vulcanization of halogenated butyl rubber by zinc oxide or acyclic diamines is relatively slow and often results in vulcanizates possessing only poor to fair dynamic properties as determined in Goodrich flexometer tests.

In accordance with the present invention, it has now been discovered that halogenated butyl rubber may be cured at an accelerated rate to produce vulcanizates exhibiting improvements in stress-strain properties such as improved tensile strength and extension modulus, as well as improved hysteresis and dynamic properties such as permanent set and dynamic drift by vulcanizing the halogenated butyl rubber in the absence of other curatives such as zinc oxide, acyclic diamines and triamines or sulfur with minor proportions of hexahydrodiazines such as hexahydro-1,2 - diazine, hexahydro - 1,3 - diazine and/or especially hexahydro-1,4-diazine (.e. piperazine).

In practicing the present invention, 100 parts by weight of halogenated butyl rubber are compounded in the absence of added sulfur, acyclic diamines and zinc oxide, with about 0.05 to 15, advantageously about 0.2 to 8.0 and preferably about 0.5 to 3.0 parts by weight of at least one hexahydrodiazine with the optional addition of such conventional compounding agents as about 5 to 150, preferably about 20 to 80 parts by weight of a filler such as clays, carbon blacks, $TiO_2$, diatomaceous earth, etc., antioxidants such as pheny beta-naphthylamine, antitack agents such as stearic acid, resins, plasticizers, etc. The resulting compounded stock is then cured by heating the same for about 1 second to 5 days, advantageously for about 20 seconds to 5 hours and preferably for about 1 minute to 2 hours at a temperature level of about 50° to 450° F., advantageously about 70° to 400° F. and preferably about 200° to 375° F. to produce a vulcanizate having a combination of excellent tensile strength and extension modulus as well as low dynamic drift and permanent set.

In producing halogenated butyl rubber to be vulcanized in accordance with the present invention, unmodified, unvulcanized butyl rubber is carefully halogenated so as to contain about at least 0.5 weight percent (preferably at least about 1.0 weight percent) combined halogen but not more than about "X" weight percent combined fluorine or chlorine or 3 "X" weight percent combined bromine or iodine wherein:

$$X = \frac{M_3 L}{(100 - L)M_1 + L(M_2 + M_3)} \times 100$$

and:

$L$ = mole percent of the multiolefin in the polymer
$M_1$ = molecular weight of the isoolefin
$M_2$ = molecular weight of the multiolefin
$M_3$ = atomic weight of halogen Restated there should be at least about 0.5 weight percent of combined halogen in the polymer but not more than about one atom of fluorine or chlorine or 3 atoms of bromine or iodine combined in the polymer per molecule of multiolefin present therein: i.e., not more than about one atom of combined fluorine or chlorine or three atoms of combined bromine or iodine per double bond in the polymer.

Suitable halogenating agents which may be employed are gaseous chlorine, liquid bromine, hydrogen fluoride, iodine monochloride, alkali metal hypochlorites, sodium hypobromite, $C_4$ to $C_{10}$ tertiary alkyl hypochlorites or hypobromites, sulfur chlorides or bromides (particularly oxygenated sulfur chlorides or bromides), pyridinium chloride perchloride, N-bromosuccinimide, tri-bromophenol bromide, N-chloroacetamide, N,N'-dimethyl-5,5 dichloro or dibromo hydantoin, and other common halogenating agents.

The halogenation is generally conducted at about −50° C. to about +150° C., advantageously at about 0° to 65° C., preferably at about 20° to 50° C. (room temperature generally being satisfactory), depending upon the particular halogenation agent, for about one minute to several hours. An advantageous pressure range is from about 0.5 to 400 p.s.i.a.; atmospheric pressure being satisfactory. The halogenation conditions are regulated to halogenate the rubbery copolymer to the extent above mentioned.

The halogenation may be accomplished in various ways. For instance, the solid copolymer may be halogenated per se. Another process comprises preparing a solution of the copolymer as above, in a suitable inert liquid organic solvent such as a $C_3$ to $C_{10}$ or preferably a $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc., and adding thereto gaseous chlorine, liquid bromine, or other halogenating agent, which may optionally be in solution, such as dissolved in an inert hydrocarbon, an alkyl chloride, carbon tetrachloride, etc.

The concentration of the butyl rubber in the solvent will depend upon the type of reactor, molecular weight halogenation agent, and amount of halogen combined in the copolymer being as follows:

| Halogenated Rubber | Isoolefin (Percent)[1] | Multiolefin (Percent)[1] | Halogenation Agent | (Percent) Halogen in the Rubber[1] |
|---|---|---|---|---|
| B | Isobutylene (98) | Isoprene (2) | $SO_2Cl_2$ | 1.2 chlorine. |
| C | Isobutylene (95) | Isoprene (5.0) | $Cl_2$ in $CCl_4$ | 2.5 chlorine. |
| D | Isobutylene (94) | Cyclopentadiene (6) | Iodine Monochloride | 1.8 iodine. |
| E | Isobutylene (92) | Myrcene (8.0) | $Cl_2$ in $CCl_4$ | 1.6 chlorine. |
| F | 2-methyl-butene-1 (95) | Isoprene (5) | $Cl_2$ in Hexane | 1.5 chlorine. |
| G | 3-methyl-butene-1 (96) | Butadiene (4) | Iodine Monochloride | 0.9 iodine. |
| H | Isobutylene (98) | 1-vinyl cyclohexene-3 (2) | N-bromosuccinimide | 0.5 bromine. |
| I | Isobutylene (92) | Butadiene (8) | Gaseous Chlorine | 2.8 chlorine. |
| J | Isobutylene (85) | Isoprene (15) | do | 6.6 chlorine. |
| K | Isobutylene (98) | Isoprene (2) | N,N'-dichloro-5,5-dimethyl hydantoin. | 1.1 chlorine. |
| L | do | do | Liquid Bromine | 2.3 bromine. |

[1] NOTE.—(Percent) in all instances is percent by weight.

of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered in various manners. The polymer may be precipitated with acetone or any other known non-solvent for the butyl rubber and dried under about 1 to 760 millimeters or higher of mercury pressure absolute at about 0° to 180° C., preferably at about 50° to 150° C., e.g. 70° C.). Other methods of recovering the halogenated butyl rubber polymer from the hydrocarbon solution of the same are by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, dried and recovered as a "crumb" or as a dense sheet or slab by conventional milling and/or extruding procedures. The halogenated copolymer formed advantageously has a viscosity average molecular weight between about 200,000 and 1,500,000 and a mole percent unsaturation of between about 0.5 to 15.0, preferably about 0.6 to 5.0.

In order to more fully illustrate the present invention, the following experimental data are given:

CHLORINATED BUTYL RUBBER "A"

A copolymer of about 97% isobutylene and 3% isoprene having a viscisity average molecular weight of 320,000 was dissolved in hexane to form a 10% solution. To this polymer solution, a 20 weight percent (based on the polymer) of liquid sulfuryl chloride as the chlorinating agent was added and reacted for 30 minutes with the polymer at room temperature. The resulting chlorinated copolymer was precipitated with acetone, collected and redissolved in hexane three times and ultimately dried and analyzed and found to have a viscosity average molecular weight of 320,000 and to contain 1.4% chlorine based on the polymer. The physical characteristics of both zinc oxide and diamine-cured vulcanizates, containing this chlorinated interpolymer, were excellent.

HALOGENATED BUTYL RUBBERS "B" TO "L"

Other examples of halogenated isoolefin-multiolefin copolymers which may be used are tabulated hereinafter, the amount of isoolefin and multiolefin in copolymer,

CHLORINATED BUTYL RUBBER "M"

An additional run was made chlorinating a commercial butyl rubber dissolved in benzene. The butyl rubber had a Mooney viscosity at 212° F. for 8 minutes of 75, and a mole percent unsaturation of 1.6. The chlorination of a solution of the uncured butyl rubber was conducted in a 500-gallon glass-lined Pfaudler reactor equipped with an agitator, baffle, submersed stainless steel sparger ring and a conduit leading into the ring.

Gaseous chlorine was continuously added to the butyl rubber solution over a period of ½ hour at a temperature level of 30° C. and under atmospheric pressure. The chlorine was added to the reactor through the conduit via the sparger ring. The chlorination was then terminated and the solution containing the chlorinated butyl rubber formed was agitated for an additional 20 minutes. The resulting solution of chlorinated butyl rubber was then water washed three times to remove dissolved hydrogen chloride.

The absolute amount of butyl rubber, benzene solvent and gaseous chlorine added, as well as the calculated percent of added chlorine based on polymer and resulting percent of chlorine combined in the polymer were as follows:

|  | Pounds | Composition of Chlorinated Product, Percent |
|---|---|---|
| Butyl rubber | 170 | 98.65 |
| Benzene solvent | 1,540 |  |
| Chlorine | 4.8 (i.e. 2.8%) | 1.35 |

The resulting water-washed solution containing the stabilized, chlorinated butyl rubber "M" was then recovered by injecting the solution into an agitated aqueous slurry containing zinc stearate and a small amount of a non-ionic wetting agent of the aliphatic polyoxyethylene ether type (e.g., Sterox AJ or Tergitol NPX) in an amount of 0.7 pound of the zinc stearate per 100 pounds of chlorinated butyl rubber as a dispersing aid. The agitated solution was maintained at a temperature between about 190° and 210° F. (e.g., 200° F.) whereby to flash off the benzene solvent and form an aqueous slurry of the chlorinated butyl rubber in water. This slurry was then filtered and the chlorinated butyl rubber, which was in the form of a wet "crumb," was placed in a Proctor and Schwartz tray drier maintained at 180° F. (i.e., 82° C.) and dried for 12 hours. The crumb depth on the tray was about ½ inch. The crumb was then completely dried and compacted by milling for 15 minutes on a conventional rubber mill having a roll temperature of 260° F. (i.e. 127° C.).

Example I 100 parts by weight of chlorinated isobutylene-isoprene butyl rubber copolymer having a Mooney viscosity (212°

F. for 8 minutes) of 65, a mole percent unsaturation of 1.3, a viscosity average molecular weight of 475,000 and a combined chlorine content of 1.1 weight percent were compounded with 50 parts by weight of HAF carbon black, 1.0 part by weight of stearic acid and 2.0 parts by weight of either an alicyclic diamine or triamine, or, in accordance with the present invention, with 2.0 parts by weight of the cyclic secondary diamine known as hexahydro-1,4-diazine (i.e. piperazine). All compounded stocks formed were then cured at 307° F. for 30 and 60 minutes with the following physical inspections being noted:

| Amine Compound | Piperazine (of the Invention) | N,N'-Di-(1-methyloctyl) p-phenylene diamine | N,N' Diisooctylhexamethylene diamine | N,N'-Diisooctylethylenediamine | Diethylenetriamine | p,p'-diaminodiphenylmethane |
|---|---|---|---|---|---|---|
| Tensile, 30' cure (p.s.i.) | 2,650 | 400 | 735 | 950 | 2,245 | 1,130 |
| 300% Modulus (p.s.i.) | 1,900 | 250 | 400 | 460 | 1,645 | 540 |
| Elongation (percent) | 380 | 800 | 740 | 690 | 395 | 635 |
| Tensile, 60' cure (p.s.i.) | 2,600 | 805 | 1,112 | 1,385 | 2,190 | 1,750 |
| 300% Modulus (p.s.i.) | 2,600 | 380 | 560 | 675 | 2,150 | 985 |
| Elongation (percent) | 300 | 655 | 590 | 550 | 305 | 500 |
| Goodrich Flexometer Data (45' @ 307° F. cure): | | | | | | |
| Dynamic drift (percent) | 0 | Failed | Failed | Failed | 6.3 | Failed |
| Permanent Set (percent) | 1.7 | Failed | Failed | Failed | 15.8 | Failed |
| Shore "A" hardness | 60 | 48 | 46 | 46 | 47 | 45 |

The above data show that, in accordance with the present invention, the cyclic secondary diamine, hexahydro-1,4-diazine (i.e. piperazine) cures chlorinated butyl rubber more rapidly than other alicyclic diamines or triamines. The vulcanizates of the present invention also possess higher tensile strengths, moduli and hardness, coupled with desirably lower values of dynamic drift and permanent set.

*Example II*

The same general procedure as in Example I was repeated substituting 5 parts by weight of zinc oxide for the two parts by weight of various alicyclic diamines and triamines. Upon curing at 250° F. for 60 minutes or at 307° F. for 15 minutes the following physical inspections were noted:

| | ZnO Control | | | Piperazine Cure (of the Invention) | | |
|---|---|---|---|---|---|---|
| | 300% Mod. | Tensile (p.s.i.) | Percent Elong. | 300% Mod. | Tensile (p.s.i.) | Percent Elong. |
| Cured at 250° F. | 455 | 700 | 570 | 860 | 1,540 | 490 |
| Cured at 307° F. | 955 | 1,550 | 485 | 1,180 | 1,985 | 415 |

The above data show that the piperazine cured vulcanizate of the present invention surpasses the zinc oxide cured vulcanizate as to both extension modulus and tensile strength.

*Example III*

The same general procedure as in Example II was repeated except that the halogenated butyl rubber was a brominated isobutylene-isoprene butyl rubber copolymer having a Mooney viscosity (212° F. for 8 minutes) of 66, a mole percent unsaturation of 0.7, a viscosity average molecular weight of 476,000, and a combined bromine content of 2.15 weight percent. The results were as follows when cured at 250° F. for 5 and 15 minutes respectively:

| | ZnO Control | | Piperazine Cure (of the invention) | |
|---|---|---|---|---|
| | Tensile Strength (p.s.i.) | Elongation (Percent) | Tensile Strength (p.s.i.) | Elongation (Percent) |
| Cured 5 Min | 345 | 705 | 2,415 | 235 |
| Cured 15 Min | 1,775 | 425 | 2,435 | 225 |

The above data show that piperazine cures brominated butyl rubber more rapidly and into higher tensile strength materials than does zinc oxide.

Resort may be had to modifications and variations of the disclosed embodiments without departing from the spirit of the invention or the scope of the appended claims.

What is claimed is:

1. A vulcanizable composition comprising a major proportion of a rubbery halogenated copolymer of about 85 to 99.5 weight percent of a $C_4$ to $C_7$ isoolefin and about 15 to 0.5 weight percent of a $C_4$ to $C_{14}$ multiolefin and a vulcanizing amount of a hexahydrodiazine, said copolymer containing at least 0.5 weight percent halogen.

2. A composition according to claim 1 in which the halogenated copolymer is selected from the group consisting of those containing at least 0.5 weight percent chlorine but not more than about one atom of chlorine per double bond in the copolymer, those containing at least about 0.5 weight percent bromine but not more than about three combined atoms of bromine per double bond in the copolymer, and mixtures thereof.

3. A composition according to claim 1 in which the hexahydrodiazine is present in an amount of between about 0.05 and 15.0 weight percent based on halogenated copolymer.

4. A composition according to claim 1 in which the hexahydrodiazine is hexahydro-1,2-diazine.

5. A composition according to claim 1 in which the hexahydrodiazine is hexahydro-1,3-diazine.

6. A composition according to claim 1 in which the hexahydrodiazine is hexahydro-1,4-diazine.

7. A composition according to claim 1 which has been vulcanized by heating the same for between about 1 second and 5 days at a temperature level of between about 50° and 450° F. to produce a vulcanizate having a high tensile strength and low permanent set.

8. A composition comprising a rubbery polymer having a viscosity average molecular weight of a least about 100,000 comprising atoms of hydrogen, carbon and a halogen selected from the group consisting of fluorine, chlorine, bromine, iodine and mixtures thereof, containing in its structure a major proportion of hydrocarbon units derived by the polymerization of isoolefins containing about 4 to 7 carbon atoms and also containing sufficient units in which a pair of carbon atoms is linked by an olefinic double bond that the mole percent unsaturation is between about 0.5 and 15; said polymer containing at least about 0.5 weight percent halogen but not more than about one combined atom of halogen per double bond in the polymer; said polymer being in composition with a vulcanizing amount of a hexahydrodiazine, said composition being free of sulfur, zinc oxide and alicyclic amines.

9. A composition according to claim 8 in which the polymer contains chlorine.

10. A composition according to claim 8 in which the polymer contains bromine.

11. A composition according to claim 8 in which the hexahydrodiazine is present in an amount of between about 0.2 and 8.0 weight percent based on the halogen-containing polymer.

12. A composition according to claim 8 in which the polymer is also in composition with about 5.0 to 150 parts by weight of a filler per 100 parts by weight of polymer.

13. A composition according to claim 8 which has been vulcanized for between about 15 minutes and 2 hours at a temperature level of between about 70° and 400° F. to produce a vulcanizate having a high tensile strength and low permanent set.

14. A process which comprises vulcanizing halogenated butyl rubber containing at least 0.5 weight percent halogen in the presence of about 0.05 to 15.0 weight percent of a hexahydrodiazine at a temperature level of between about 70 and 400° F. until the resulting vulcanizate exhibits a tensile strength of at least about 1500 p.s.i. and a permanent set of below about 5%.

15. A process according to claim 14 in which the halogenated butyl rubber contains chlorine.

16. A process according to claim 14 in which the halogenated butyl rubber contains bromine.

References Cited in the file of this patent

UNITED STATES PATENTS

| | | |
|---|---|---|
| 2,804,448 | Hallenbeck | Aug. 27, 1957 |
| 2,816,098 | Morrissey | Dec. 10, 1957 |